F. K. & E. F. ATKINS.
CENTRIFUGAL PRESSURE FILTER.
APPLICATION FILED DEC. 13, 1915.

1,219,796.

Patented Mar. 20, 1917.
3 SHEETS—SHEET 1.

WITNESSES

INVENTORS
F. K. Atkins
E. F. Atkins
BY
ATTORNEYS

F. K. & E. F. ATKINS.
CENTRIFUGAL PRESSURE FILTER.
APPLICATION FILED DEC. 13, 1915.

1,219,796.

Patented Mar. 20, 1917.
3 SHEETS—SHEET 2.

WITNESSES

INVENTORS
F. K. Atkins
E. F. Atkins
BY 
ATTORNEYS

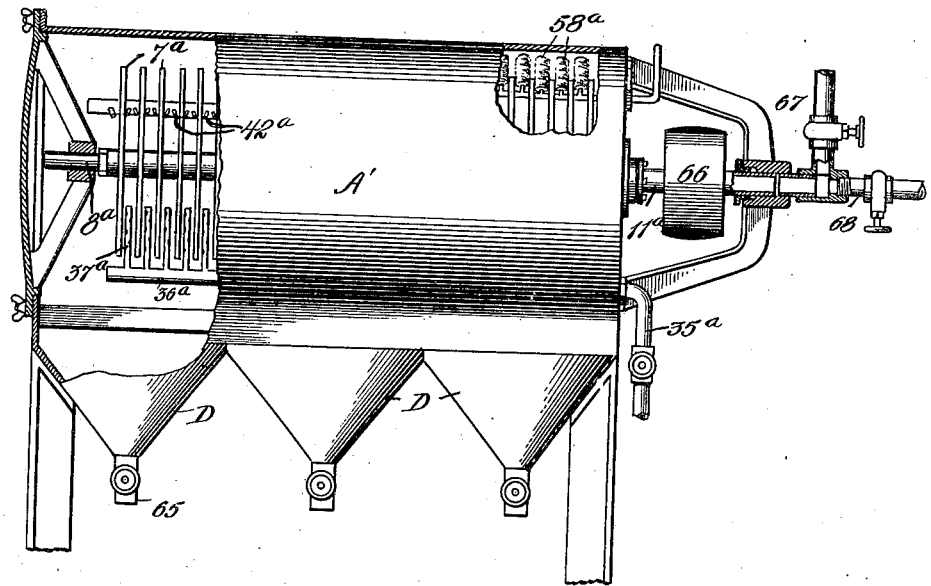
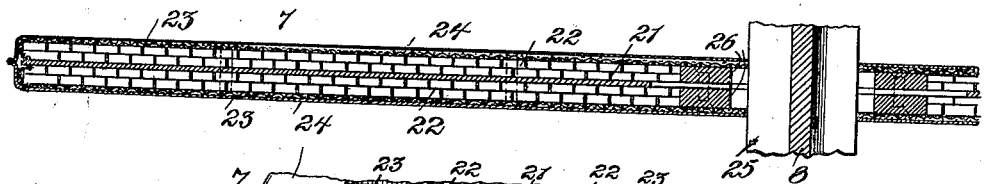
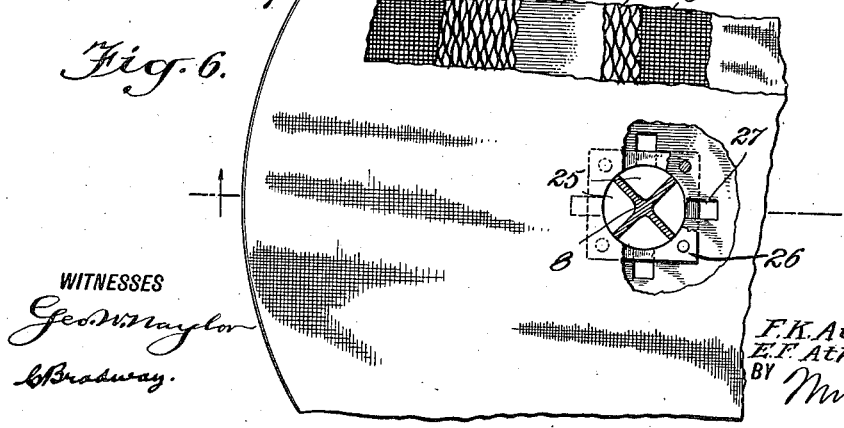

UNITED STATES PATENT OFFICE.

FRANK K. ATKINS AND EARL F. ATKINS, OF NEW YORK, N. Y.

CENTRIFUGAL PRESSURE-FILTER.

1,219,796.  Specification of Letters Patent.  Patented Mar. 20, 1917.

Application filed December 13, 1915. Serial No. 66,515.

*To all whom it may concern:*

Be it known that we, FRANK K. ATKINS and EARL F. ATKINS, citizens of the United States, and residents of the city of New York, borough of Manhattan, in the county and State of New York, have invented a new and Improved Centrifugal Pressure-Filter, of which the following is a full, clear, and exact description.

This invention relates to centrifugal pressure filters of that type in which the filter elements rotate within a body of liquid to be filtered that is contained in a vessel to which the liquid is supplied under pressure, the rotating filtering elements causing the liquid to acquire a centrifugal motion whereby the solid particles are thrown outwardly against the surrounding wall of the chamber on which the said particles collect and flow by gravity to a suitable point of discharge.

The invention has for its general objects to provide an improved pressure filter of this character which is reliable and efficient in use, comparatively simple and inexpensive to manufacture and keep in operative condition, and capable of filtering a large volume of water with a minimum consumption of power.

The invention has for more specific objects the provision of a novel arrangement of filtering elements rotatably mounted in the casing of the apparatus and an effective device for supplying the liquid to be filtered in such manner as to be discharged in streams under pressure against the surfaces of the filtering medium while the process of filtration is going on, which contributes to keeping the same comparatively free of accumulation of solids thereupon. This device may also be used for externally washing the filtering elements, and it has stationary parts projecting between the revolving elements that serve to retard the rotary movement of the materials under treatment within the separating chamber, with the advantageous effect of scouring the solids off from the percolating surfaces, which contributes to freer percolation of the liquid through the same.

Further objects are the provision of means for drawing off liquid from the interior of the apparatus whenever it is desired to wash the solids or remove the same, and means for producing a reverse flow of cleaning fluid through the outlet pipe and filtering elements for washing the filtering medium of the elements reversely.

With such objects in view, and others which will appear as the description proceeds, the invention comprises various novel features of construction and arrangement of parts which will be set forth with particularity in the following description and claims appended hereto.

In the accompanying drawings, which illustrate certain embodiments of the invention and wherein similar characters of reference indicate corresponding parts in all the views, Figure 1 is a central vertical section of a vertical type of centrifugal pressure filter;

Fig. 4 is a side view of a horizontal centrifugal pressure filter;

Fig. 5 is a fragmentary sectional view of a filtering element; and

Fig. 6 is a plan view of a portion of a filtering element.

Figure 1:
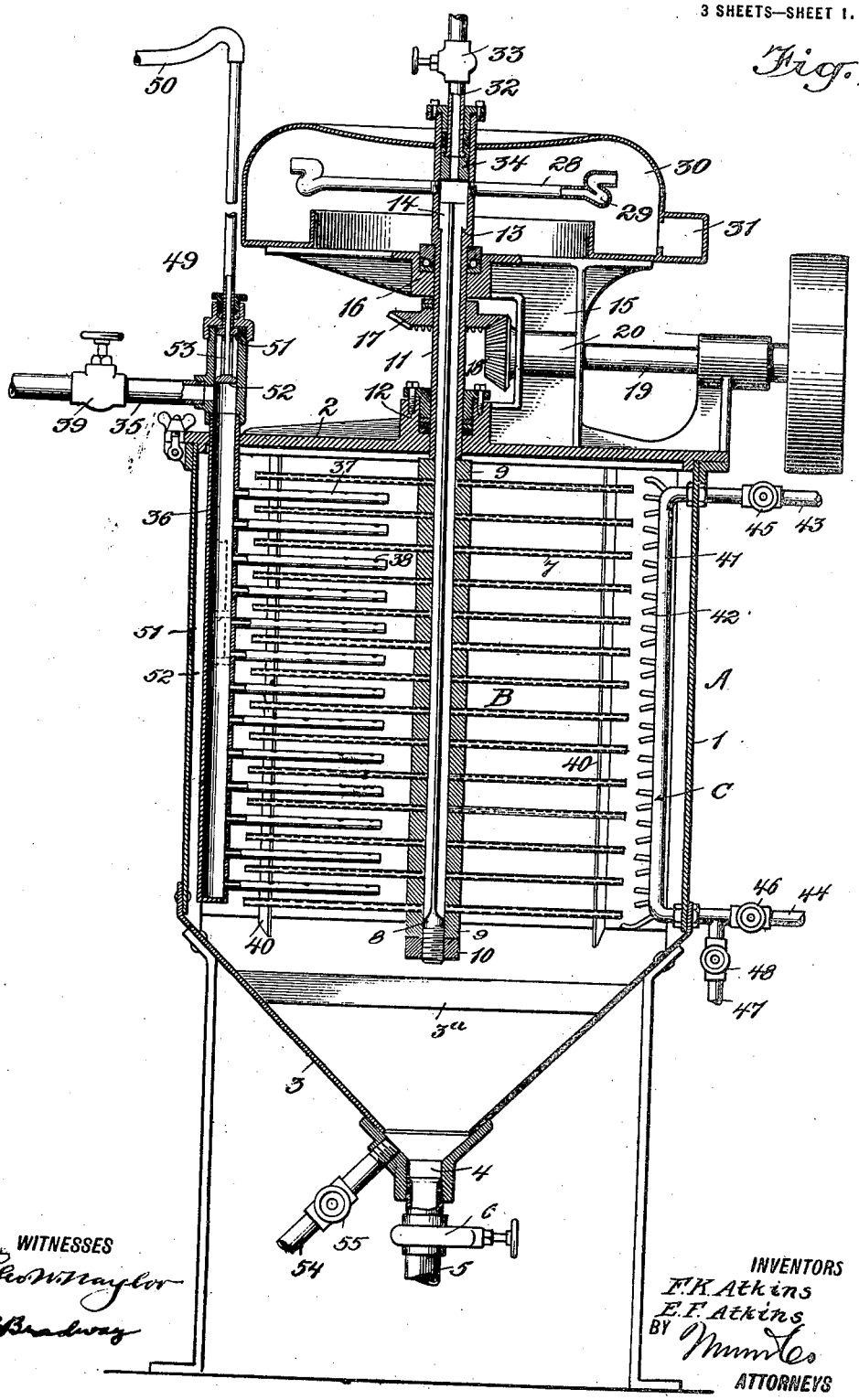

Referring to the drawing, A designates the casing of the filtering element, which may be of any desired construction, and within the same is a rotor B which embodies a plurality of filtering elements. The casing A, as shown in Fig. 1, comprises a cylindrical body 1 which is closed at its top by a head 2 and at its bottom by a funnel 3, which latter has an outlet 4 connected with a pipe 5 that contains a valve 6. The cover 1 is removable so as to provide access to the interior of the casing, and on this cover the rotary body B is supported.

The rotary structure B within the casing A is composed of horizontal filtering elements 7 which are arranged in superimposed relation, and they are assembled on a central shaft 8 with washers or spacers 9 interposed between the disk-like filtering elements. The shaft has its lower end threaded and a nut 10 is screwed thereon so as to clamp the filtering elements together. These elements are a few inches apart and they are in diameter somewhat less than the diameter of the casing A, so that there will be a circumferential zone around the filtering elements adjacent the wall of the casing for the collection of the solid matter. The shaft 8 extends upwardly through a tube or pipe 11 which passes through a stuffing box 12 in the cover 2, and the upper end of this tube or pipe has an internal shoulder 13 with which engages an enlargement or head 14 on the upper end of the shaft or rod 8, whereby the latter constitutes a bolt. By tightening the nut 10 the sleeve 11, washers or spacers 9 and filtering elements 7 are all clamped together as a unitary structure. A bracket 15 rises from the cover 2 and has a bearing 16 for the upwardly projecting end of the rotating element B. On the tube 11 is a bevel gear 17 which meshes with a bevel gear 18 on a drive shaft 19 which is journaled in bearings 20 on the cover.

The filtering elements may be of any desired construction, but, as shown in Figs. 5 and 6, each element comprises a circular imperforate plate 21 which has on opposite sides expanded metal plates 22, and covering these is wire mesh 23 or equivalent material, and the structure thus formed is covered by canvas or equivalent fabric 24. The liquid percolates through the canvas, wire mesh and expanded metal and flows inwardly along the top and bottom sides of the imperforate plate 21 to the center, and from this point the liquid passes into longitudinal channels 25 in the rod 8, which latter is of cruciform cross-section, as shown in Fig. 6, there being four passages 25. Washers 26 are riveted to opposite sides of the central plate 21, and these washers serve to make the centers of the filtering elements solid, so that they will not collapse when clamped between the spacers 9, Fig. 1. The washers 26 have ports 27 through which the filtered liquid passes into the channels 25.

At the top of the conduit formed by the channeled rod 8, washers 9 and tube 11, are radially disposed outlet nozzles 28 which have their outer ends provided with traps 29, and the filtered liquid is discharged centrifugally through these nozzles 28 into a surrounding chamber 30 which has a tangential outlet 31. The discharge conduit may be utilized for effecting a reverse washing of the filtering elements by forcing water or other fluid under high pressure downwardly through the conduit, and thence outwardly through the walls of the filtering elements. For this purpose a water supply pipe 32 containing a valve 33 extends into the upper end of the pipe 11, and on this pipe 32, which can move axially, is a piston 34 which, by moving downwardly, closes the discharge nozzles 28, when the valve 33 can be opened to force the water reversely through the filtering elements.

The material to be filtered is supplied through a pipe 35 which connects with a manifold 36 extending axially of the casing adjacent the outer wall thereof, and attached to this manifold are short pipes 37 which extend radially and terminate adjacent the center of the casing, there being a short pipe 37 between adjacent filtering elements. These short pipes have upwardly and downwardly discharging openings 38 which discharge the liquid to be filtered against the rotating filtering elements 7. In the supply pipe 35 is a valve 39 whereby the pipe can be opened or closed, or pressure controlled. It is to be understood that, during the operation of the apparatus the supply of liquid to be filtered is continuous, and the discharge of filtered liquid is also continuous, the solid matter being thrown outwardly against the circumferential wall of the casing so that it can flow down by gravity into the settling funnel 3. To assist in arresting the centrifugal movement of the solid matter, vertically extending flanges 40 are applied to the internal surface of the cylindrical body 1. The solid matter is arrested by these flanges or baffles and more easily forced into the collection funnel 3.

A device C for externally washing the filtering elements is arranged in the casing between the cylindrical wall 1 and the filtering elements. This device comprises a vertical pipe 41 which has a plurality of pairs of nozzles 42, there being as many pairs of nozzles as there are filtering elements, and the nozzles for each filtering element discharge a stream of water or other fluid against the top and bottom surfaces of the associated filtering element. The pipe 41 is connected at its upper and lower ends with supply pipes 43 and 44 which have valves 45 and 46, respectively. Fluid can be supplied simultaneously through both of the pipes 43 and 44, so that high pressure streams will be discharged from all the nozzles. This washing of the filtering elements preferably takes place when the apparatus is empty. The drawing off of the liquid from the apparatus may be accomplished by the nozzles 42, pipes 41 and 44, and drainage pipe 47 connected with the pipe 44. In the pipe 47 is a valve 48 which is adapted to be opened when the draining is to take place, and the valve 46 will of course then be closed.

The external washing of the filtering elements may also be accomplished by means of the multiple jet nozzles 37. For this purpose a supply pipe 49 is movable longitudinally of the manifold 36, and this pipe is connected with a flexible conduit 50, and on the inner end of the pipe 49 are spaced heads 51 and 52 between which are ports 53. By moving the pipe 49 downwardly into the manifold 36 and turning on the supply of water or other liquid through the conduit 50, water will flow through the pipe 49, ports 52 and into any two of the multiple jet nozzles 37, whereby high pressure jets will be discharged through the filtering elements, which are preferably rotated slowly during the washing operation. By utilizing only a few of the multiple jet nozzles at a time, the high pressure of the jets flowing out of the apertures in the nozzles will be much higher than if all of the nozzles were operating at the same time under a given head. Normally the pipe 49 is in raised position so as to not interfere with the flow of liquid to be filtered through the pipe 35.

It is sometimes desirable to wash the solids, and to accomplish this the liquid is drawn off from the apparatus, and a stream of water is discharged into the bottom of the funnel through a pipe 54. This causes the solids to be agitated and thoroughly washed, the water being passed off through the filtering elements and discharge conduit in the regular manner. After the solids are washed the valve 55 is closed and the washed solids can be drawn off through the pipe 5.

Figure 3:
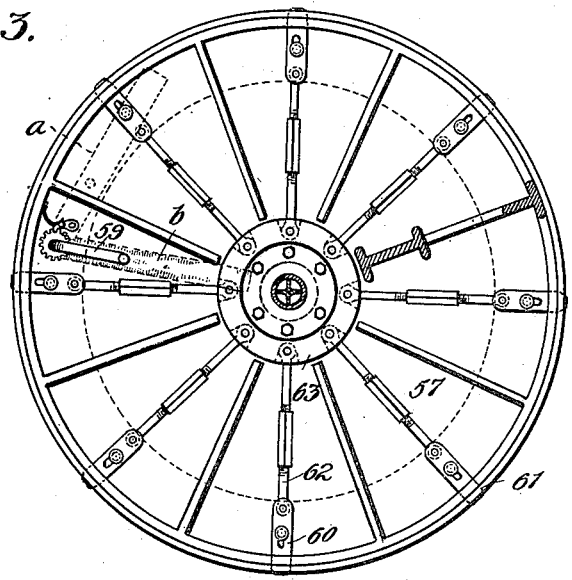
Fig. 3 is a horizontal section on the line 3—3, Fig. 2.
Figure 2:
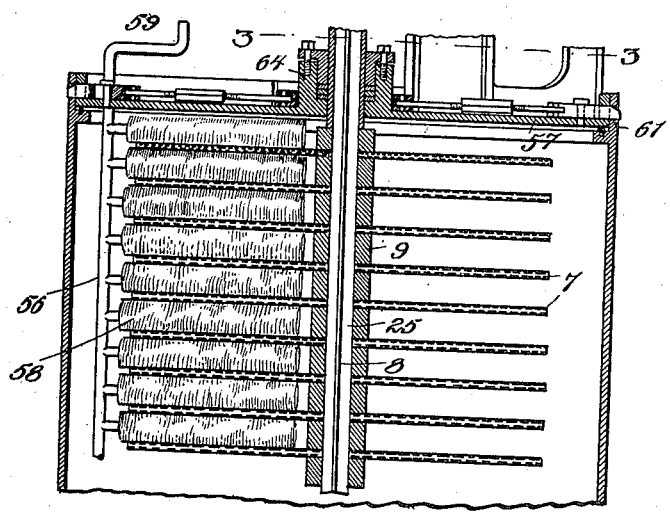
Fig. 2 is a central section of the upper portion of a modified form of a centrifugal pressure filter.
Figure 2:

In Figs. 2 and 3 a modified form of the invention is shown as regards the means for externally cleaning the filtering elements. Extending longitudinally of the casing adjacent the outer wall thereof is a vertical rod 56 supported by the cover 57, and on this rod are parallel brushes 58 which are so arranged as to engage the upper and lower surfaces of the filtering elements. On the upper end of the rod is an operating crank 59, and by means of this crank the brushes can be thrown from the inoperative position $a$, shown in Fig. 3, to the operative position $b$. While the filtering elements are rotated the brushes effectively scrub the outer surface thereof. The effectiveness may be increased by forcing water through the filtering elements in a reverse direction while the brushes are in action, or streams of water can also be played on the outer surfaces of the filtering elements. In Figs. 2 and 3 the cover 57 is locked in closed position by wedge bolts 60 mounted on the cover and engaging in apertures 61 in the body of the apparatus. The wedge bolts are connected by adjustable rods 62 with a rotary ring 63 surrounding the stuffing box 64 on the cover. By turning the ring the bolts can be thrown into or out of locking position.

In the modification shown in Fig. 4 a horizontal type of machine is shown. The casing A' has a plurality of funnel-shaped chambers D at its bottom for collection of the solids which are separated from the liquid, and each chamber has a valve-controlled outlet 65. The filtering elements $7^a$ are mounted on a horizontal shaft $8^a$ constructed in the same manner as shown in Fig. 1, and on the tubular member $11^a$ is a driving pulley 66. The filtered liquid is drawn off through a valve-controlled pipe 68, and water for reverse washing is supplied to the filtering elements through a valve-controlled pipe 67. The liquid to be filtered is supplied through a pipe $35^a$ which is connected with a manifold $36^a$ that has the jet nozzles $37^a$. The scrubbing brushes for cleaning the filtering elements are indicated at $58^a$, and the nozzles for discharging water against the outside of the filtering elements for cleaning the same are indicated at $42^a$. The operation of this type of machine as regards the separation of solids from liquid is substantially the same as that previously described.

In a construction such as that shown in Fig. 1, where the collecting chamber 3 is at the bottom, it may be desirable to provide a suitable baffling means $3^a$ which serves to destroy the centrifugal motion of the liquid in the collection chamber 3, so as to produce a quiescent state to promote the settling of the solids.

We desire furthermore to set forth the fact that this machine is so designed and constructed that it may be operated as a highly efficient pressure filter when the shaft and elements are at rest, and under certain conditions and for the handling of certain materials, this method of operation is preferable. In such case, the accumulation of the solid material in the form of a cake on the surfaces of the elements during the process of filtration necessarily occurs.

Examples may be mentioned as follows:

Where there is available an elevated source of supply with connection giving inexpensive pressure from a gravity column, which will eliminate the cost of power for rotating the parts.

In that class of materials where the solid particles tend to be sufficiently porous to permit of a fair rate of percolation even though a cake be accumulated of considerable thickness, or where it is found expedient to maintain such a cake in order to obtain the desired degree of purity of filtrate.

Where the solids have values in their contained solution which can be recovered by washing the cake and displacement thereof by clear water, such as in the treatment of free cyaniding ores, or in sweetening off in the sugar refineries. When the time comes to dispose of the solids the shaft and elements are revolved, which throws the solids outwardly and clears the filter cloth, which will then be ready to receive another charge, or, in case power is not available for revolving the parts, the solids may be washed off the percolating surfaces by the methods provided and sluiced out of the machine through the outlet at the bottom as shown.

Referring to the brushes it will be observed that by using them coöperatively with the filtering elements as the latter rotate, the brushes not only produce a scraping or scouring action on the surface of the filtering elements, but crowd the solids outwardly beyond the rim of such elements, whereby the coagulated mass is permitted to settle by gravity into the chamber below the filtering elements.

From the foregoing description taken in connection with the accompanying drawings, the advantages of the construction and method of operation will be readily understood by those skilled in the art to which the invention appertains, and while we have described the principle of operation, together with the apparatus which we now consider to be the best embodiment thereof, we desire to have it understood that the apparatus shown is merely illustrative and that such changes may be made when desired as fall within the scope of the appended claims.

Having thus described our invention, we claim as new and desire to secure by Letters Patent:

1. In a pressure filter, the combination of a stationary casing, a plurality of disk-like filtering elements connected together in slightly spaced relation, means for rotatably supporting the elements, means for supplying to the space between the elements, the liquid to be filtered, a central conduit communicating with all the filtering elements for discharging the filtered liquid, and means for collecting the solids.

2. In a pressure filter, the combination of a casing, a plurality of rotatable filtering elements disposed therein, a manifold in the casing, perforated nozzles connected with the manifold and extending into the spaces between the elements, a supply pipe connected with the manifold, and means for drawing off the filtered liquid.

3. In a pressure filter, the combination of a casing, a plurality of rotatable filtering elements disposed therein, a manifold in the casing, perforated nozzles connected with the manifold and extending into the spaces between the elements, a supply pipe connected with the manifold to supply thereto the liquid to be filtered, means for utilizing any of the nozzles for discharging a fluid therethrough and upon the outer surfaces of the elements for cleaning the same, and means communicating with the filtering elements for drawing off the filtered liquid.

4. In a pressure filter, the combination of a casing, a plurality of rotatable filtering elements disposed in the casing and connected together in spaced relation, a conduit connected with the filtering elements to draw off the filtered liquid, a manifold in the casing, nozzles thereon and extending into the spaces between the filtering elements, a pipe connected with the manifold for supplying thereto the liquid to be filtered, a pipe movable longitudinally of the manifold, means on the inner end of the pipe in the manifold for establishing communication between such pipe and any desired nozzle for discharging fluid through the latter for cleaning the adjacent filtering elements externally, and means at the bottom of the casing for collecting the solids.

5. In a pressure filter, the combination of a casing, a plurality of disk-like filtering elements disposed therein, means supporting the elements and forming an outlet conduit for the filtered liquid, means for rotating the said means, and a device in the casing having a plurality of nozzles for discharging simultaneously streams of fluid upon the outer surfaces of the filtering elements for cleaning the same.

6. In a pressure filter, the combination of a casing, a plurality of disk-like filtering elements disposed therein, means supporting the elements and forming an outlet conduit for the filtered liquid, means for rotating the said means, a device in the casing having a plurality of nozzles for discharging simultaneously streams of fluid upon the outer surfaces of the filtering elements for cleaning the same, valved pipes connected with opposite ends of the said device for supplying fluid thereto, and a valved drain connected with the bottom of the said device whereby the latter can be used for draining the liquid out of the casing.

7. In a pressure filter, the combination of a casing, filtering means therein, devices on the inside of the casing for arresting the centrifugal motion of the solids, and a valve-controlled collection chamber at the bottom of the casing for receiving the solids.

8. In a pressure filter, the combination of a casing, a rotatable filtering means therein, devices on the inside of the casing for arresting the centrifugal motion of the solids, a valve-controlled collection chamber at the bottom of the casing for receiving the solids, means disposed in the casing and extending longitudinally thereof for drawing off the liquid from the casing independently of the filtering means, and means for drawing off the filtered liquid.

9. In a pressure filter, the combination of a casing, rotary filtering means mounted therein, a collection chamber under the filtering means for receiving the solids, a valved outlet connected with the bottom of the collecting means, a valved inlet connected with the bottom of the collecting means for directing upwardly into the solids therein a flow of water for washing the solids, and means on the internal surface of the casing to direct the solids from the filtering means to the collecting means.

10. In a pressure filter, the combination of a casing having a funnel-shaped bottom into which solids collect, rotary filtering means disposed in the casing above the funnel-shaped bottom, means on the inner surface of the casing for directing the solids into the said bottom, a valved outlet for the bottom, a water supply pipe connected with the bottom at a point adjacent the outlet for discharging upwardly into the solids a supply of water for washing the solids.

11. In a pressure filter, the combination of a casing, filtering means, a hollow rotatable shaft supporting and communicating with the filtering means to receive filtered liquid therefrom, a nozzle connected with the shaft for producing by centrifugal action a suction through the shaft, means within the shaft for closing the nozzle, and means for supplying reversely through the shaft and through the filtering means a flow of fluid when the nozzle is closed and while the filtering means rotates for reversely cleaning the latter.

12. In a pressure filter, the combination of a casing, rotatable filtering elements therein, a hollow shaft supporting the elements and communicating therewith, a centrifugally acting outlet nozzle carried by the shaft and communicating therewith, a piston movable in the shaft for closing the nozzle, and means connected with the piston for supplying fluid through the shaft and into the filtering elements for reversely cleaning the same while the shaft rotates.

13. In a pressure filter, the combination of a casing, rotatable filtering means therein, a conduit connected with the said means, centrifugally discharging nozzles connected with the conduit, and means connected with the conduit for closing the nozzles and forcing a cleaning fluid reversely through the filtering means.

14. In a pressure filter, the combination of a channeled rod, filtering elements assembled thereon, washer-like spacers interposed between the elements, and means for clamping the elements and spacers together.

15. In a pressure filter, the combination of a rod having a head at one end and provided with longitudinal channels, a tube surrounding the headed end of the rod and having a shoulder with which the head engages, hollow filtering elements assembled on the rod and communicating with the channels thereof, spacers interposed between the filtering elements, and means on the extremity of the rod opposite from the head and coöperating with the latter for clamping the filtering elements and spacers together.

16. In a filter of the class described, the combination of a rotary filtering element, an outlet pipe connected with the center of the element and located in the axis of rotation, and an approximately radially extending outlet nozzle connected with the said pipe whereby the filtered liquid is discharged centrifugally.

17. In a filter of the class described, the combination of a rotary filtering element, an outlet pipe connected with the center of the element and located in the axis of rotation, an approximately radially extending outlet nozzle connected with the said pipe whereby the filtered liquid is discharged centrifugally, and a trap on the outer end of said nozzle.

18. A filter of the class described comprising a casing, means for supplying thereto the liquid to be filtered, a rotatable filtering element in the casing, said filtering element having a central outlet, and a nozzle extending outwardly from the axis of rotation and connected with the outlet, whereby the filtered liquid is discharged centrifugally through the nozzle.

19. A filter of the class described comprising a casing, means for supplying thereto the liquid to be filtered, a rotatable filtering element in the casing, said filtering element having a central outlet, and a nozzle extending from the axis of rotation and connected with the outlet, whereby the filtered liquid is discharged centrifugally through the nozzle, the outer end of the nozzle being bent inwardly and then outwardly to form a trap.

20. In a pressure filter, the combination of a stationary casing, a plurality of disk-like filtering elements connected together in slightly spaced relation, means for rotatably supporting the elements, means for supplying to the space between the elements the liquid to be filtered, a central conduit communicating with all the filtering elements for discharging the filtered liquid, and means for collecting the solids, said conduit having radial pipes extending therefrom and which have their outer ends bent inwardly and then outwardly to form traps through which the filtered liquid discharges.

21. A filter comprising a casing having a chamber in its bottom for the collection of solids, a rotatable filtering structure in the casing, whereby the liquid to be filtered receives a centrifugal motion for throwing outwardly against the wall of the casing the solid matter, and means located under the said structure for preventing a centrifugal motion of the contents of the collection chamber.

22. A filter comprising a casing, means for supplying thereto the liquid to be filtered, a plurality of spaced filtering elements rotatably mounted therein, and a cleaning device mounted in the casing outwardly from the elements and having members extending between the elements and operating simultaneously on opposed surfaces thereof for cleaning the latter.

In testimony whereof we have signed our names to this specification in the presence of two subscribing witnesses.

FRANK K. ATKINS.
EARL F. ATKINS.

Witnesses:
HOWARD D. ATKINS,
WILLIAM B. AITCHESON.